(12) United States Patent
Sun et al.

(10) Patent No.: US 7,505,440 B2
(45) Date of Patent: *Mar. 17, 2009

(54) METHOD AND APPARATUS FOR ORTHOGONALLY OVERLAYING VARIABLE CHIP RATE SPREAD SPECTRUM SIGNALS

(75) Inventors: Feng-Wen Sun, Germantown, MD (US); Lin-Nan Lee, Potomac, MD (US); Khalid Karimullah, Olney, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/009,275

(22) Filed: Jan. 17, 2008

(65) Prior Publication Data

US 2008/0137766 A1     Jun. 12, 2008

Related U.S. Application Data

(60) Continuation of application No. 10/346,876, filed on Jan. 17, 2003, now Pat. No. 7,342,904, which is a division of application No. 09/115,256, filed on Jul. 13, 1998, now Pat. No. 6,510,147.

(60) Provisional application No. 60/052,574, filed on Jul. 15, 1997.

(51) Int. Cl.
  *H04B 7/216*   (2006.01)
  *H04B 1/02*    (2006.01)
  *H04J 11/00*   (2006.01)
  *H04J 13/00*   (2006.01)
  *H04Q 7/00*    (2006.01)

(52) U.S. Cl. ............... 370/335; 370/342; 370/441; 370/209; 370/329; 370/479; 455/103

(58) Field of Classification Search ............ 370/335, 370/342, 441, 209, 329, 479; 455/103
See application file for complete search history.

(56) References Cited

U.S. PATENT DOCUMENTS

| 4,425,642 A | 1/1984 | Moses et al. |
| 4,901,307 A | 2/1990 | Gilhousen et al. |
| 5,751,761 A | 5/1998 | Gilhousen |
| 5,949,796 A | 9/1999 | Kumar |
| 6,064,663 A | 5/2000 | Honkasalo et al. |

(Continued)

OTHER PUBLICATIONS

Notice of Allowance dated Sep. 15, 2008 in U.S. Appl. No. 10/346,883 filed Jan. 17, 2003 by Lin-Nan Lee et al.

*Primary Examiner*—Ronald Abelson (57) ABSTRACT

A system and method for transmitting wideband signals via a radio communication system adapted for transmitting narrow-band signals is described. A base station is used to transmit and receive a plurality of relatively narrow-band and a plurality of relatively wideband signals. The electromagnetic spectrum available to the plurality of narrow-band signals is selectively shared with the electromagnetic spectrum available to the wideband signals by systematically separating the orthogonal codes and the carrier frequencies used for transmission. The prefixes of the orthogonal codes are preferably mutually exclusive and the carrier frequencies are preferably separated by an offset. The offset may be substantially equal to an integer multiple of the narrow-band signal's chip rate. Alternatively, the offset may be substantially equal to an odd multiple of one half the narrow-band signal's chip rate in which case every other bit of the orthogonally encoded data is inverted.

30 Claims, 8 Drawing Sheets

U.S. PATENT DOCUMENTS

| | | |
|---|---|---|
| 6,069,880 A | 5/2000 | Owen et al. |
| 6,091,788 A | 7/2000 | Keskitalo et al. |
| 6,108,323 A | 8/2000 | Gray |
| 6,400,679 B1 | 6/2002 | Suzuki |
| 6,735,240 B1 | 5/2004 | Kang |
| 6,826,169 B1 | 11/2004 | Nagatani et al. |

METHOD AND APPARATUS FOR ORTHOGONALLY OVERLAYING VARIABLE CHIP RATE SPREAD SPECTRUM SIGNALS

RELATED APPLICATION

This application is a continuation of prior U.S. patent application Ser. No. 10/346,876, entitled "METHOD AND APPARATUS FOR ORTHOGONALLY OVERLAYING VARIABLE CHIP RATE SPREAD SPECTRUM SIGNALS," by Feng-Wen Sun, Lin-Nan Lee and Khalid Karimullah, filed Jan. 17, 2003 now U.S. Pat. No. 7,342,904, which is a divisional of U.S. patent application Ser. No. 09/115,256, entitled "METHOD AND APPARATUS FOR ORTHOGONALLY OVERLAYING VARIABLE CHIP RATE SPREAD SPECTRUM SIGNALS," by Feng-Wen Sun, Lin-Nan Lee and Khalid Karimullah, filed Jul. 13, 1998 and now patented as U.S. Pat. No. 6,510,147 on Jan. 21, 2003, which claims priority from U.S. Provisional Application Ser. No. 60/052,574, filed on Jul. 15, 1997, all of which applications are hereby incorporated by reference herein.

TECHNICAL FIELD OF THE INVENTION

The present invention related generally to radio communication systems, and more particularly to a method and apparatus for transmitting wideband signals via a communications system adapted for transmitting narrow-band signals.

BACKGROUND OF THE INVENTION

Radio communication systems rely on modulating carrier frequencies in a finite portion of the electromagnetic spectrum to wirelessly transmit and receive signals. Modulation can be performed on the amplitude, frequency, and/or phase of the carrier frequency to separate the signal from unwanted noise. The signals typically convey information such as voice, video, and computer data to and from transceiving devices such as cellular base stations, cellular subscriber units, and personal computers.

The portion of the electromagnetic spectrum occupied by a particular transmission or communication system (i.e. bandwidth) may be wide or narrow. Wideband signals can be used to transmit large amounts of data in a relatively short period of time. For example, large computer data files and real-time video could benefit from a wideband signal. Narrow-band signals can be used to conserve the electromagnetic spectrum when transmitting signals with more modest requirements. For example, base stations and cellular subscriber units in most conventional cellular communication systems transmit and receive voice signals using a relatively narrow-band signal.

The amount of usable electromagnetic spectrum is limited by technology, environment, and cost. Extremely high frequency signals require expensive transceiving equipment. Accordingly, communication systems benefit by sharing desirable frequencies. Well known multiple access techniques, such as code division multiple access (CDMA), time division multiple access (TDMA), and frequency division multiple access (FDMA) can be used by a communication system to share the electromagnetic spectrum available to that system.

Spread spectrum communication systems transmit signals occupying a bandwidth in excess of the minimum necessary to send the information. Spreading may be accomplished by means of a code which is independent of the data. Each symbol of the spreaded signal is a chip. The chip rate determines the bandwidth of the signal; and, the ratio of the chip rate to the incoming information data rate is the spreading gain. In the mobile communication industry, a redundancy code such as a forward error correction code is also generally included when computing the total spreading gain.

In spread spectrum CDMA systems a predefined chip rate (i.e. one bandwidth) is typically used so that orthogonality can be readily achieved using binary orthogonal codes (e.g., Walsh codes) thus minimizing intra-cell interference. The chip rate is the rate (i.e., frequency) at which changes (i.e., modulations) are being made to the carrier frequency. There are many reasons for spreading the spectrum. One application in a mobile communications environment is to achieve efficient multiple access (i.e., CDMA). By spreading the signal to wider bandwidth, CDMA allows multiple users to share the same frequency band at the same time. More conventional applications for spread spectrum communications include anti-jamming, anti-interference, and low probability of intercept.

Prior art approaches to bandwidth utilization suffer from certain drawbacks. For instance, prior art approaches do not allow wideband signals to occupy excess capacity in a narrow band system or narrow-band signals to occupy excess capacity in a wide band system. Further, prior art approaches require new communication systems infrastructure (e.g., base stations) to support new types of signals (i.e., signals using different bandwidths).

As is known in the art, a wide-band spreaded signal can in principal overlay one or more narrow-band signals that are transmitted simultaneously with the wideband signal. Spreaded signals occupy a bandwidth that is wider than necessary for their transmission, thereby spreading their total power across a wideband spectrum with respect to narrow-band underlay signals. Ideally, narrow-band receivers recognize the portion of the spreaded signal within their narrow spectrum as noise and can discriminate their narrow-band signals from the interfering wideband signals.

In practice, simple spreading of a wideband signal fails to provide a workable overlay solution. For example, in the cellular/data system discussed above, a spreaded wideband transmission on the forward link (i.e. cell site to mobile station) introduces sufficient spectral power within the underlay narrow-band spectrums so that interference becomes intolerable, or discrimination at the narrow-band mobile user's units becomes cost prohibitive or infeasible.

SUMMARY OF THE INVENTION

In accordance with a first aspect of the invention, a system for transmitting data having first and second bandwidths, the second bandwidth being narrower than the first bandwidth, is provided. The system comprises a means for dividing the first bandwidth data into a predefined number of data streams based on the ratio of the first and second bandwidths, a means for encoding the first bandwidth data streams with a first orthogonal code selected from a set of mutually orthogonal codes, a means for combining the orthogonally encoded data streams into a first bandwidth spreaded signal, and a means for encoding the second bandwidth data to produce a second bandwidth spreaded signal. The first bandwidth and second bandwidth codes are selected from a set of mutually orthogonal codes so that no first or second bandwidth code or its complement is a prefix for another first or second bandwidth code or its complement. For even second to first bandwidth ratios every other bit of each first bandwidth data stream may be inverted. The system further comprises a first transmitter for transmitting the first bandwidth spreaded signal at a first carrier frequency and a second transmitter for transmitting the second bandwidth signal at a second carrier frequency. The second transmitter operates at a predefined chip rate, wherein the first and second carrier frequencies are substantially separated by an integer multiple for odd second to first bandwidth ratios, or an integer multiple plus one-half of the predefined chip rate for even second to first bandwidth ratios.

BRIEF DESCRIPTION OF THE DRAWINGS

These and other features and advantages of the present invention will become more apparent from a detailed consideration of the following detailed description of certain preferred embodiments when taken in conjunction with the drawings in which.

DETAILED DESCRIPTION OF THE PREFERRED EMBODIMENTS

Although for simplicity of explanation, the following description focuses primarily on transmitting wideband signals via a radio communication system adapted for transmitting narrow-band signals, persons of ordinary skill in the art will readily appreciate that the techniques of the present invention are in no way limited to radio communications, to transmitting signals with only two distinct bandwidths, or to systems adapted for transmitting narrow-band signals. On the contrary, any communication system which might benefit from shared access to a plurality of frequencies by two or more transceivers transmitting and/or receiving signals at two or more bandwidths may employ the techniques shown herein. Such systems might include systems employing methods for transmitting narrow-band signals via a radio communication system adapted for transmitting wideband signals. Further, wired systems such as computer networks could employ the techniques provided herein without departing from the scope of the invention.

Figure 1:
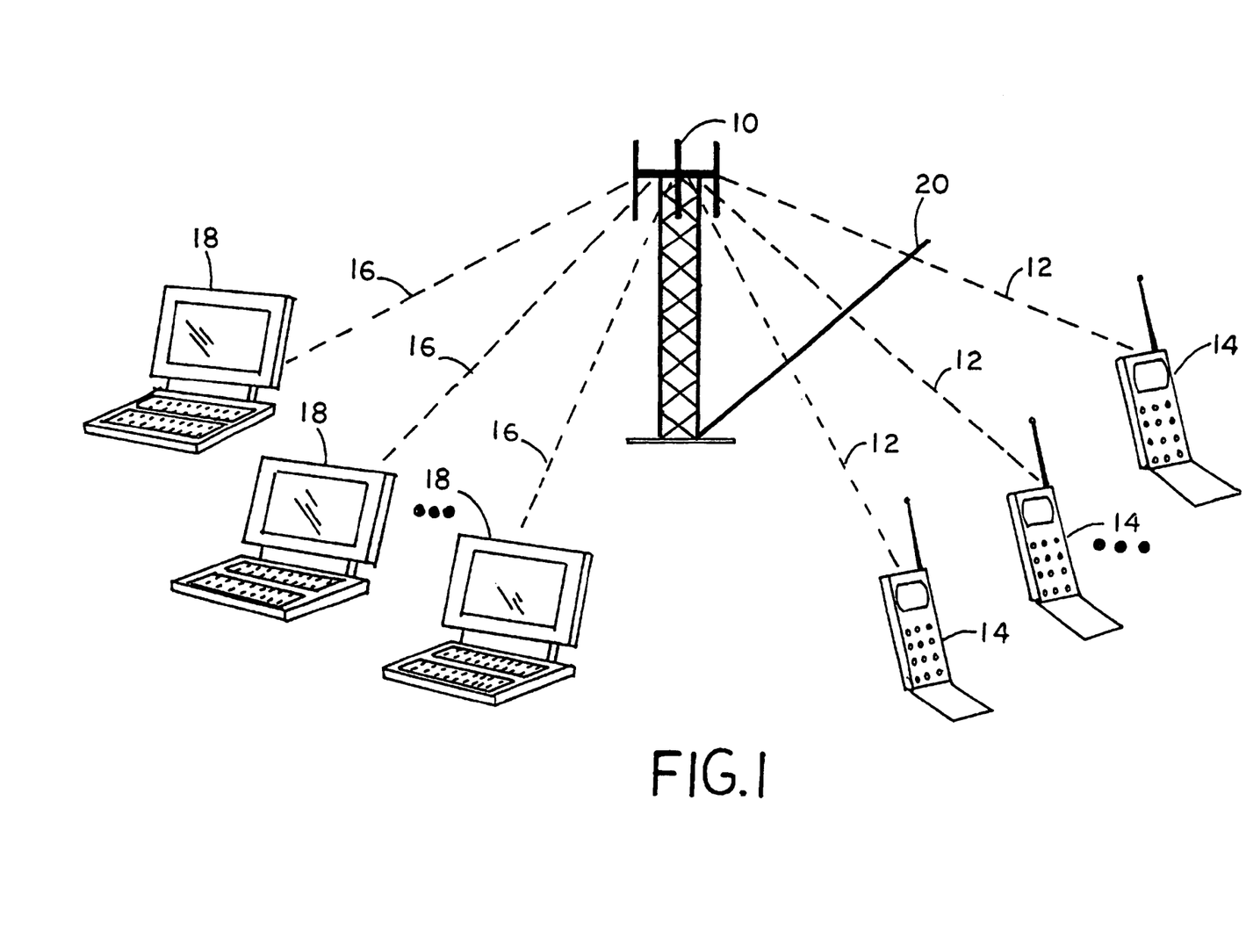
FIG. 1 is a schematic illustration of a communication system capable of utilizing the teachings of the present invention.

A representative communication system capable of utilizing the teachings of the present invention is shown in FIG. 1. A base station 10, such as a cellular communications base station, is used to transmit and receive a plurality of relatively narrow-band signals 12, such as voice signals, to and from a plurality of narrow-band transceivers (transmitter/receiver) 14, such as mobile cellular subscriber units. The base station 10 is typically coupled to a network 20, such as a public switched telephone network (PSTN), the Internet, and/or any other analog or digital network. Radio signals (narrow-band signals 12 and/or wideband signals 16) transmitted to the transceivers (narrow-band transceivers 14 and/or wideband transceivers 18) by the base station 10 could originate from a device connected to the network 20. Similarly, signals 12, 16 transmitted to the base station 10 by the transceivers 14, 18 could be destined for a device connected to the network 20.

The narrow-band signal(s) 12 are transmitted by modulating one or more carrier frequencies 15 (shown in FIGS. 2 and 3) with relatively narrow bandwidths (e.g. 1.25 MHz as is used for a conventional voice cellular channel). The narrow-band signal(s) 12 may represent digitally encoded voice signals, short data messages, and/or any other narrow-band signals or combinations of signals. Cooperation among the narrow-band transceivers (i.e. mobile units) 14 to share the available electromagnetic spectrum can be achieved using well known multiple access techniques such as code-division multiple access (CDMA).

The base station 10 could also be used to transmit and receive a plurality of relatively wideband signals 16, such as data signals, to and from a plurality of wideband transceivers 18, such as computers. The wideband signal(s) 16 are transmitted by modulating a carrier frequency 15b with a relatively wide bandwidth (e.g., a bandwidth sufficient for transmitting a data signal such as 3.75 MHz). The wideband signal(s) 16 could be analog video signals, digitally encoded video signals, long data messages, and/or any other wideband signals or combinations of signals. Cooperation among the wideband transceivers 18 to share the available electromagnetic spectrum can be similarly achieved using well known multiple access techniques such as code-division multiple access (CDMA). Preferably, the wideband signal 16 is encoded with forward error correction codes such as turbo codes, or any convolutional code.

In conventional wireless communication systems wideband and narrow-band signals would occupy distinct regions of the electromagnetic spectrum to avoid interference. However, in a preferred embodiment of the present invention, the electromagnetic spectrum available to the plurality of narrow-band signals 12 is selectively shared with the electromagnetic spectrum available to the wideband signals 16. Important aspects of the present invention minimize interference between wideband signals and narrow-band signals by maintaining orthogonality between the wideband overlay and narrow-band underlay signals. As discussed in greater detail below, the present invention maintains substantial orthogonality between wideband and narrow-band signals that share a common frequency spectrum by 1) selectively aligning or spacing the narrow-band carrier frequency/frequencies with respect to the wideband carrier frequency, 2) spreading signals with orthogonal codes particularly selected to minimize correlation between wideband and narrow-band signals, and 3) spreading the wideband signals by dividing them into a plurality of data streams, spreading the individual data streams, and then recombining the data streams before transmission.

Figure 2:
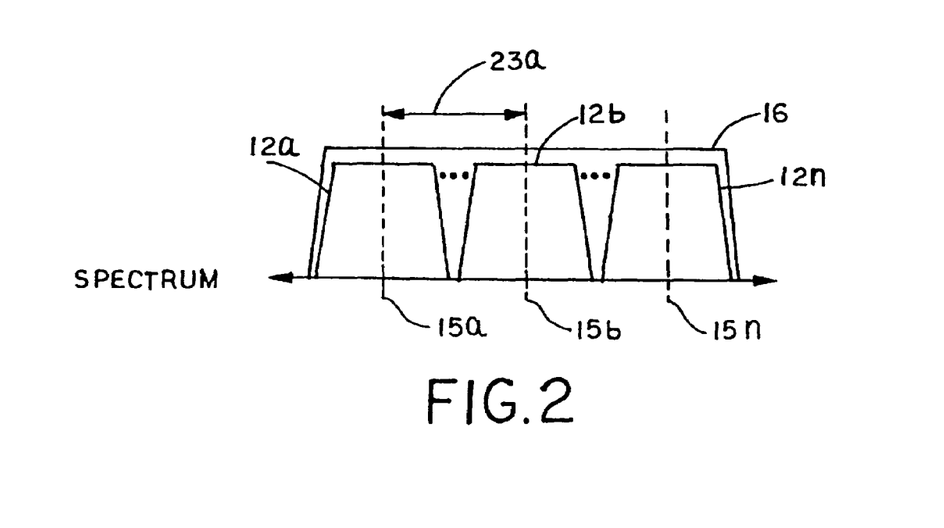
FIG. 2 is a spectral diagram of a wideband signal and narrow-band signals transmitted in accordance with the teachings of the invention.
Figure 3:
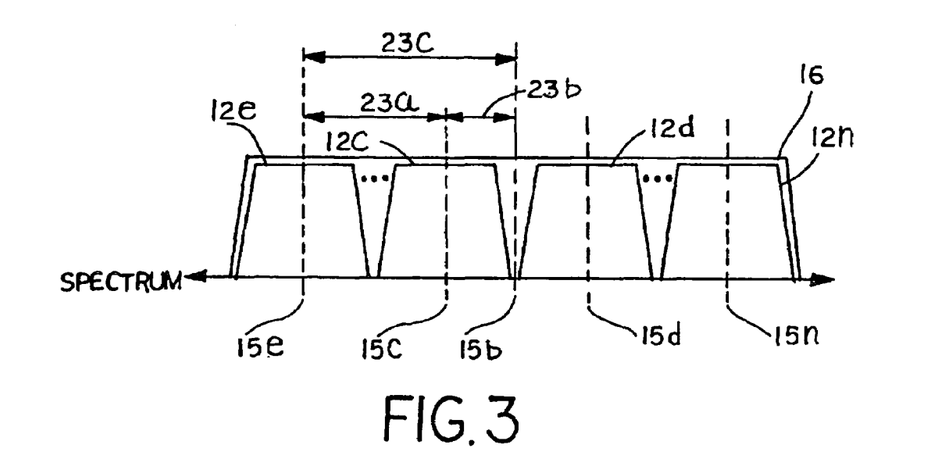
FIG. 3 is a spectral diagram of a wideband signal and narrow-band signals transmitted in accordance with the teachings of the invention.

Illustrated in FIG. 2 and FIG. 3 are spectral diagrams of a spreaded wideband signal 16 (i.e., an overlay signal) overlapping a plurality of narrow-band signals 12 (i.e., underlay signals). Although a limited number of signals 12, 16 are shown, any number of narrow-band signals 12 and wideband signals 16 may be accommodated using the teachings of the present invention. Namely, one or many wideband signals 16 may overlay one or many narrow-band signals 12. In any case, the narrow band signal(s) 12 share substantially the same frequency spectrum as the wideband signal(s) 16.

One aspect of the present invention maintains orthogonality between wideband overlay and narrow-band underlay signals by selectively aligning or spacing the narrow-band carrier frequency/frequencies with respect to the wideband carrier frequency. Preferably, the carrier frequencies for one or more narrow-band signals are selected so that they are spaced or offset from the wideband carrier frequency by an integer multiple of the narrow-band chip rate, or alternatively by an integer multiple of the narrow-band chip rate plus one-half the narrow-band chip rate.

By way of example only, FIG. 2 illustrates one or more narrow band signals 12 and carrier frequencies 15 that may be present and overlaid by a wideband signal 16. The wideband signal 16 has a first carrier frequency 15*b* and overlays a first narrow-band signal 12*a* having a second carrier frequency 15*a*. In accordance with the present invention, the second carrier frequency 15*a* is spectrally separated from the wideband carrier frequency 15*b* by a first offset 23*a* such that the offset 23*a* corresponds to an integer multiple of the narrow-band chip rate. Similarly, the wideband signal 16 may overlay a second narrow-band signal 12*b* having the first carrier frequency 15*b* (i.e. the offset corresponds to the integer zero times the narrow-band chip rate). Those skilled in the art will immediately recognize that FIG. 2 most clearly illustrates the spectral overlay aspect of the present invention for situations where the ratio of the wideband chip rate to the narrow-band chip rate (i.e. ratio of the bandwidths) is an odd integer (e.g. three).

By way of example only, FIG. 3 most clearly illustrates the spectral overlay aspect of the present invention for situations where the ratio of the narrow-band chip rate to the wideband chip rate is an even integer (e.g. four). As shown, the wideband signal 16 may overlay one or more narrow-band signals 12. The wideband signal 16 has the first carrier frequency 15*b* and may overlay a third narrow-band signal 12*c* having a third carrier frequency 15*c*. In accordance with the present invention, the third carrier frequency 15*c* is spectrally separated from the wideband carrier frequency 15*b* by a second offset 23*b* such that the offset 23*b* corresponds to an integer multiple of the narrow-band chip rate or bandwidth plus one-half the narrow-band chip rate (i.e. zero times the narrow-band chip rate plus 0.5 times the narrow-band chip rate). Similarly, the wideband signal 16 may overlay a fourth narrow-band signal 12*e* having a fourth carrier frequency 15*e* that is spectrally separated from the wideband carrier frequency 15*b* by a third offset 23*c* (i.e. the offset corresponds to the integer one times the narrow-band chip rate plus one-half the narrow-band chip rate).

It is important to recognize that the number of underlay signals 12 present is not critical, but rather that any underlay signals that are present are preferably associated with carrier frequencies selectively spaced with respect to the wideband carrier frequency in accordance with the spectral overlay aspect of the present invention as discussed above.

Those skilled in the art will appreciate that, as a practical matter, the ratio of a wideband system's chip rate to that of a narrow-band system's chip rate may not result in a precise integer value as is preferred according to the spectral overlay aspect of the present invention described above. However, any interference between wideband signals and narrow-band signals resulting from imprecise carrier frequency spacings may be sufficiently mitigated by minimizing the spacing errors and through signal encoding that utilizes a particular set of orthogonal codes which are described in more detail below.

Another aspect of the present invention maintains orthogonality between wideband overlay and narrow-band underlay signals by selecting particular orthogonal codes. In a typical CDMA communication system orthogonal codes (e.g., Walsh codes) are used to spread a data stream and differentiate transmissions (i.e. maintain signal orthogonality).

Typically, each user, within a cell site for example, is assigned one or more orthogonal codes from a set of mutually orthogonal codes (e.g., Walsh codes) during the setup of a call. The user typically releases the assigned code in exchange for a new assigned code upon leaving a cell and entering a new cell.

By way of example only, each user's data stream is mapped to a Walsh code so that a logical one maps to the orthogonal code itself and logical zero maps to its binary complement or vice versa. In accordance with the present invention, orthogonal codes are selected from the set of Walsh codes to minimize potential correlation between wideband overlay signals and narrow-band underlay signals.

The set of Walsh codes can be generated using a Hadamard matrix. A Hadamard matrix of order n can be defined recursively as:

$$W_{2n} = \begin{bmatrix} W_n & W_n \\ W_n & \overline{W_n} \end{bmatrix}$$

Where $W_1$ is defined as $W_1=[0]$ and $\overline{W}_1$ is the binary complement of $W_1$. A Walsh code of length 2n corresponds to a row of the matrix $W_{2n}$.

Figure 4:
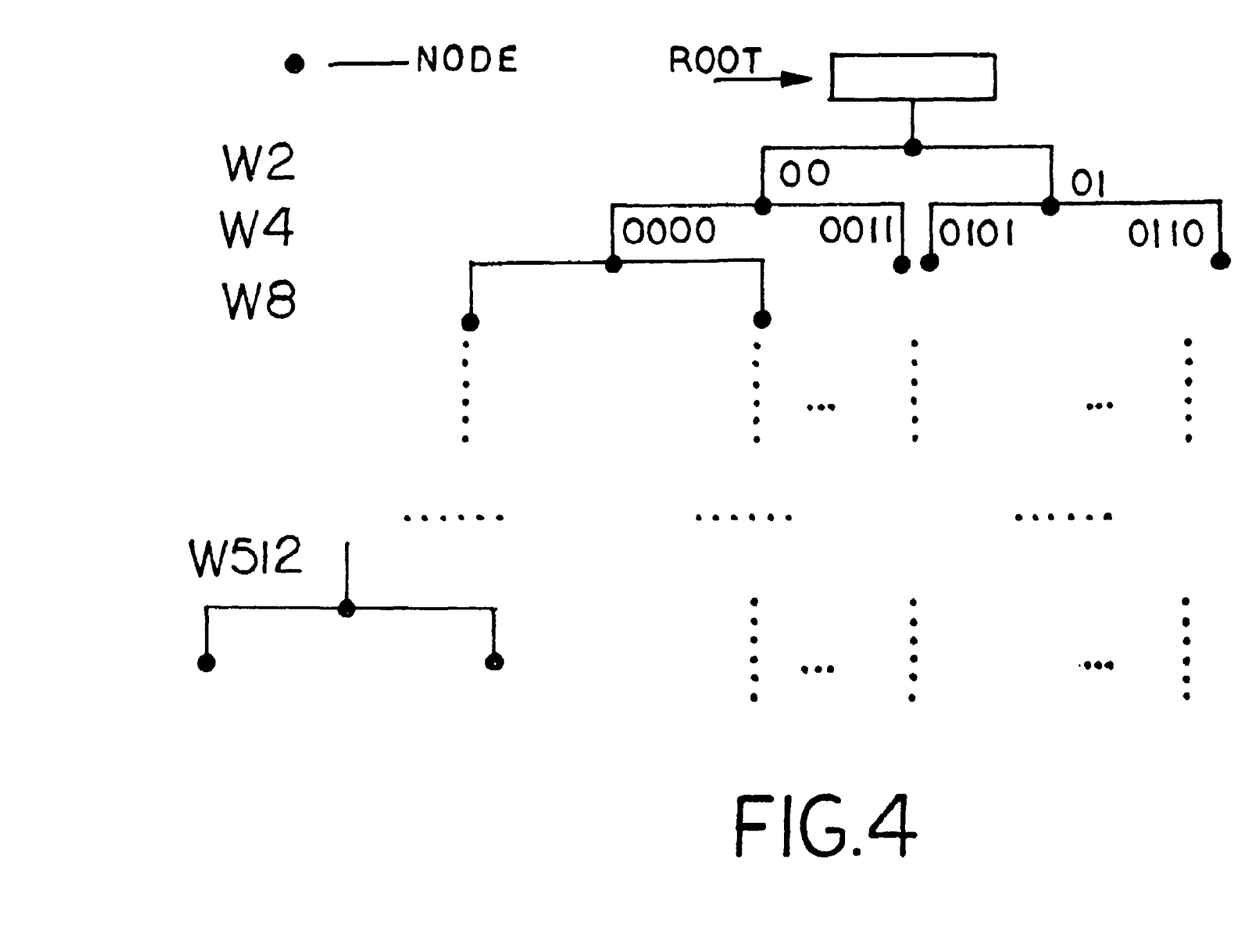
FIG. 4 is a diagram of Walsh tree.

An alternative way to describe the Walsh codes is illustrated in FIG. 4. The unique Walsh code of length one (e.g. zero) sits at the root of the tree. Each node is connected to two additional nodes having Walsh codes that are generated by creating two longer Walsh codes. One longer code is made from the common node's code value concatenated with itself, and the other is made from the common node's code concatenated with its complement. For example, the common node "00" generates and is connected to longer codes "0000" and "0011". Thus, each level of the tree shown in FIG. 4 is associated with Walsh codes of the same length, and code length grows by a factor of two for each additional level that is added to the tree.

For any two Walsh codes (two nodes in the tree, not necessarily at the same level), we can trace the tree toward the root until the traced back path first meets at a node. This common node along the traced back paths of two different Walsh codes is defined as the first common node Note that the Walsh code represented by the first common node of two Walsh codes is the prefix of both Walsh codes and it is the largest common prefix.

In accordance with the present invention, Walsh codes may be selected from various levels of the tree and assigned to wideband and narrow-band users within a cell site, for example. Codes are preferably selected for the wideband and narrow-band users so that no assigned codes, or their complements, contain a prefix matching another shorter assigned code. For example, if the codes 01101001 and 10010110 (i.e. the complement) have been assigned to a narrow-band user then no wideband users or narrow-band users, within the same cell site, may be assigned the codes 01, 10, 0110, 1001 etc.

Those skilled in the art will recognize that selectively assigning Walsh codes to narrow-band and wideband users as described above minimizes correlation between wideband and narrow-band signals, and thereby minimizes intracell interference between wideband and narrow-band users.

In accordance with another aspect of the present invention, the selection and assignment of Walsh codes to wideband and narrow-band users may be further refined to reduce intracell interference. As discussed above, practical considerations may prevent precise alignment or spacing of the wideband carrier frequency with respect to the narrow-band carrier frequency/frequencies. For these situations it is preferable to select Walsh codes having first common nodes that are close to the root of the Walsh tree (shown in FIG. 4), and additionally in accordance with the mutually exclusive prefix aspect discussed above. Walsh codes having first common nodes as close as possible to the root of the Walsh tree to minimize interference between signals because orthogonality can be achieved with a minimal amount of correlation time.

Figure 5:
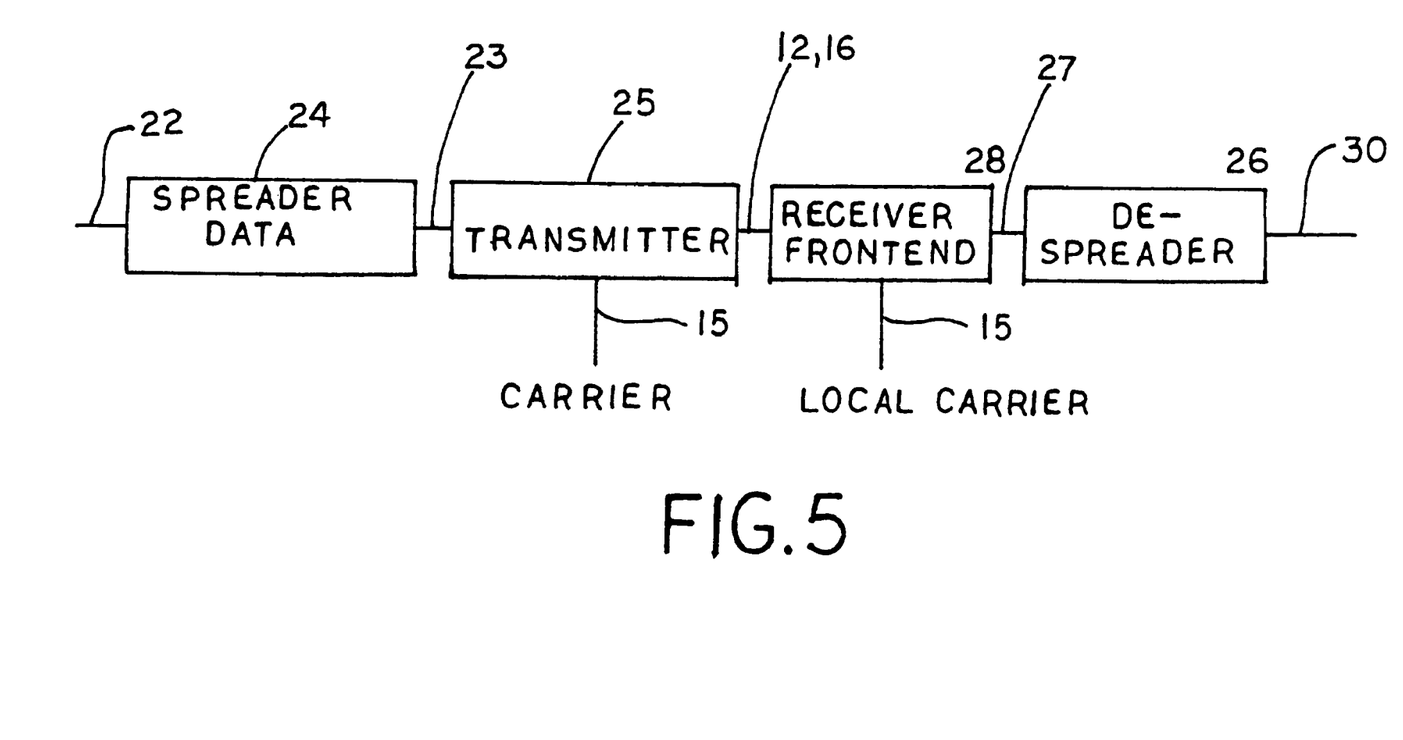
FIG. 5 is a block diagram of a typical code-division multiple access transmitter and receiver.

A typical CDMA communication system is shown in FIG. 5. A data signal 22 representing a message to be sent is processed by a spreader 24 to produce a spreaded signal 23. The spreading may be accomplished using pseudo-random codes, orthogonal codes, forward error correction codes, and/or any other code. The spreaded signal 23 is mixed with a carrier frequency 15 by a transmitter 25 to produce a radio signal (narrow-band signal 12 or wideband signal 16). The spreader 24 and the transmitter 25 may be one of many which are integral to the base station 10 and/or transceivers 14, 18. The radio signal 12, 16 is captured by a receiver front-end 28 (integral to the base station 10 and/or transceivers 14, 18) and is mixed with a locally generated carrier frequency 15 thereby downconverting it to an intermediate frequency or baseband signal 27. The baseband signal 27 is processed by a despreader 26 to produce an estimate 30 of the data signal 22.

Figure 6:
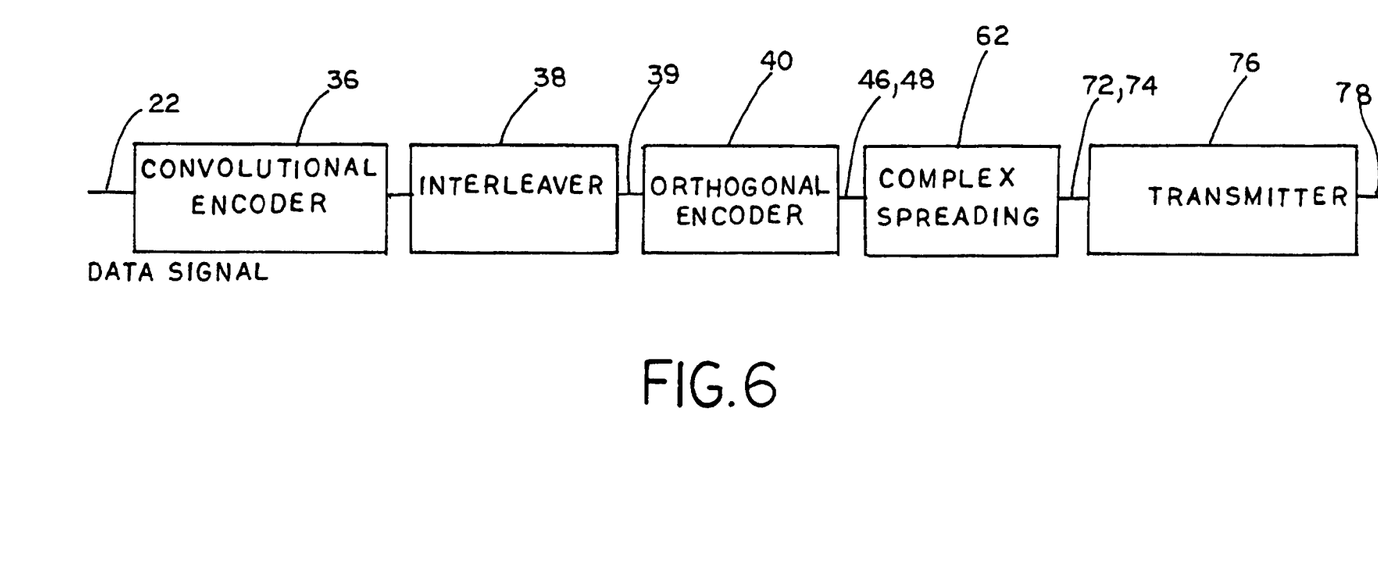
FIG. 6 is a block diagram of a system embodying aspects of the present invention.

A block diagram of a system embodying the above and other aspects of the present invention is depicted generally in FIG. 6. The data signal 22 to be transmitted is preferably encoded with a forward error correction code by a convolutional encoder 36, typically comprising shift registers and modulo-2 adders. The encoded signal is then processed by an interleaver 38. The interleaver 38 shuffles the bits into a random sequence, thus making burst errors, which are common in a wireless communication system, appear to be random errors after deinterleaving. An interleaved data stream 39 is subsequently processed by an orthogonal encoder 40. The orthogonal encoder 40 spreads the interleaved data stream by modulating it with orthogonal codes (i.e. Walsh codes). Spreaded data signals 46, 48 are then passed through a complex spreading block 62 that multiplies the in-phase (I) and citriodora phase (Q) components of the spreaded signals with pseudo-random sequences. The output of the complex spreading block is coupled to a transmitter 76 that transmits encoded/spreaded signals 72, 74 on a wideband or a narrow-band carrier frequency in accordance with the frequency overlay aspect of the present invention.

Figure 7:
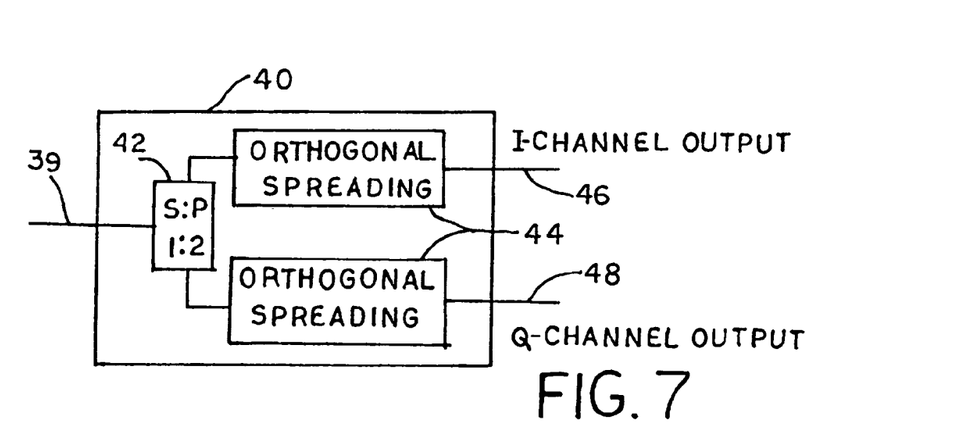
FIG. 7 is a more detailed diagram one possible orthogonal encoder of FIG. 6 in accordance with the teachings of the present invention.
Figure 8:
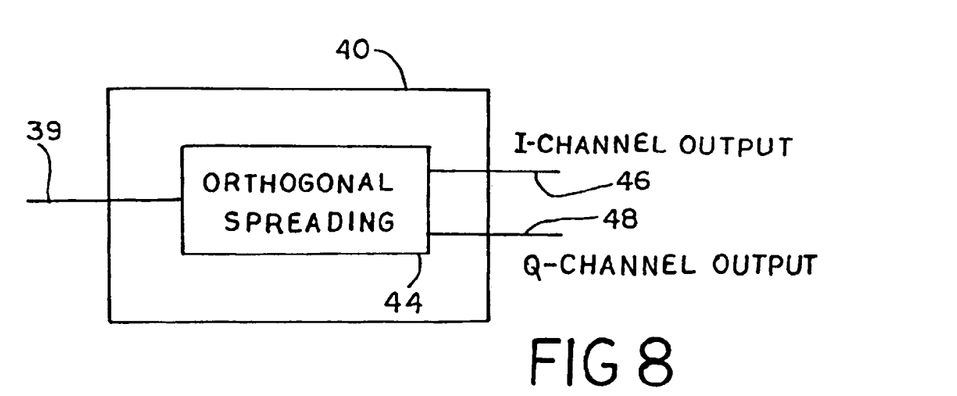
FIG. 8 is a more detailed diagram of another possible orthogonal encoder of FIG. 6 in accordance with the teachings of the present invention.

More detailed diagrams of the orthogonal encoder 40 are illustrated in FIGS. 7 and 8. The topology of the encoder 40 may vary with the particular modulation scheme employed. For example, if Quadrature Phase Shift Keying (QPSK) modulation is used (shown in FIG. 7), then the orthogonal encoder 40 preferably divides the interleaved data stream 39 into two data streams via a serial-to-parallel converter 42. Each data stream is processed by an orthogonal spreading block 44. The encoder 40 provides I&Q channel outputs 46, 48 are provided by the encoder 40. Alternatively, if Binary Phase Shift Keying (BPSK) modulation is used (as shown in FIG. 8), then the interleaved data stream 39 is processed directly by the orthogonal spreading block 44 to provide I&Q channel outputs 46, 48. Those skilled in the art will recognize that with the QPSK modulation scheme shown in FIG. 7 the I channel 46 and the Q channel contain different information, whereas with the BPSK modulation scheme shown in FIG. 8 the I channel and Q channel contain identical, but phase shifted information.

In accordance with the present invention, for narrow-band signals/users, the orthogonal spreading block 44 directly maps the interleaved data stream 39 into the orthogonal code (i.e. Walsh code). Thus, a logical one maps to the orthogonal code and a logical zero maps to its binary complement or vice versa. For wideband signals/users the configuration of the orthogonal spreading block 44 corresponds to the ratio (M) of the wideband overlay signal chip rate to the narrow-band underlay signal chip rate. For M ratios that are substantially equal to an odd integer (e.g. three) the spreading block 44 is preferably configured as shown in FIG. 9, and for substantially even M ratios the spreading block 44 is preferably configured as shown in FIG. 10.

Figure 9:
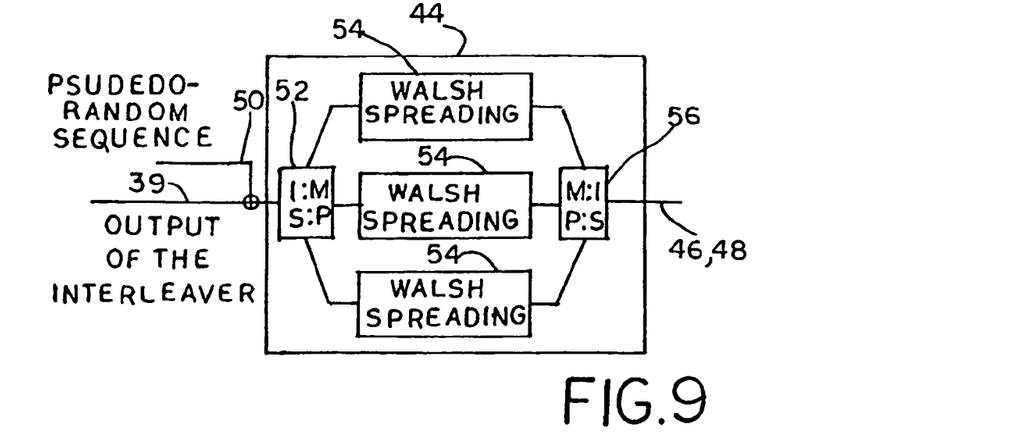
FIG. 9 is a more detailed diagram of a possible orthogonal spreader of FIG. 6 for wideband signals.

As shown by example in FIG. 9, for an odd M ratio substantially equal to three, the interleaved data signal 39 is multiplied (scrambled) by a pseudo-random sequence 50 and is then divided into three data streams by a serial-to-parallel convertor 52. Each of the data streams is processed by a Walsh spreading block 54 that encodes the data stream with a Walsh code selected in accordance with the present invention so that no orthogonal code is a prefix of any other orthogonal code assigned within a cell site. If the carrier frequencies for wideband overlay signals and narrow-band underlay signals cannot be precisely aligned or spaced in accordance with spectral overlay aspect of the present invention, then Walsh codes are preferably also selected so that the first common nodes are as close as possible to the root of the Walsh tree. Additionally, the Walsh codes used within the spreading blocks 54 may all be the same for a given user, or a user may have multiple codes assigned so that some or all of the spreading blocks 54 use different codes. The individually spreaded data streams are then recombined in a parallel-to-serial converter 56 that produces the I channel output 46 or Q channel output 48.

Figure 10:
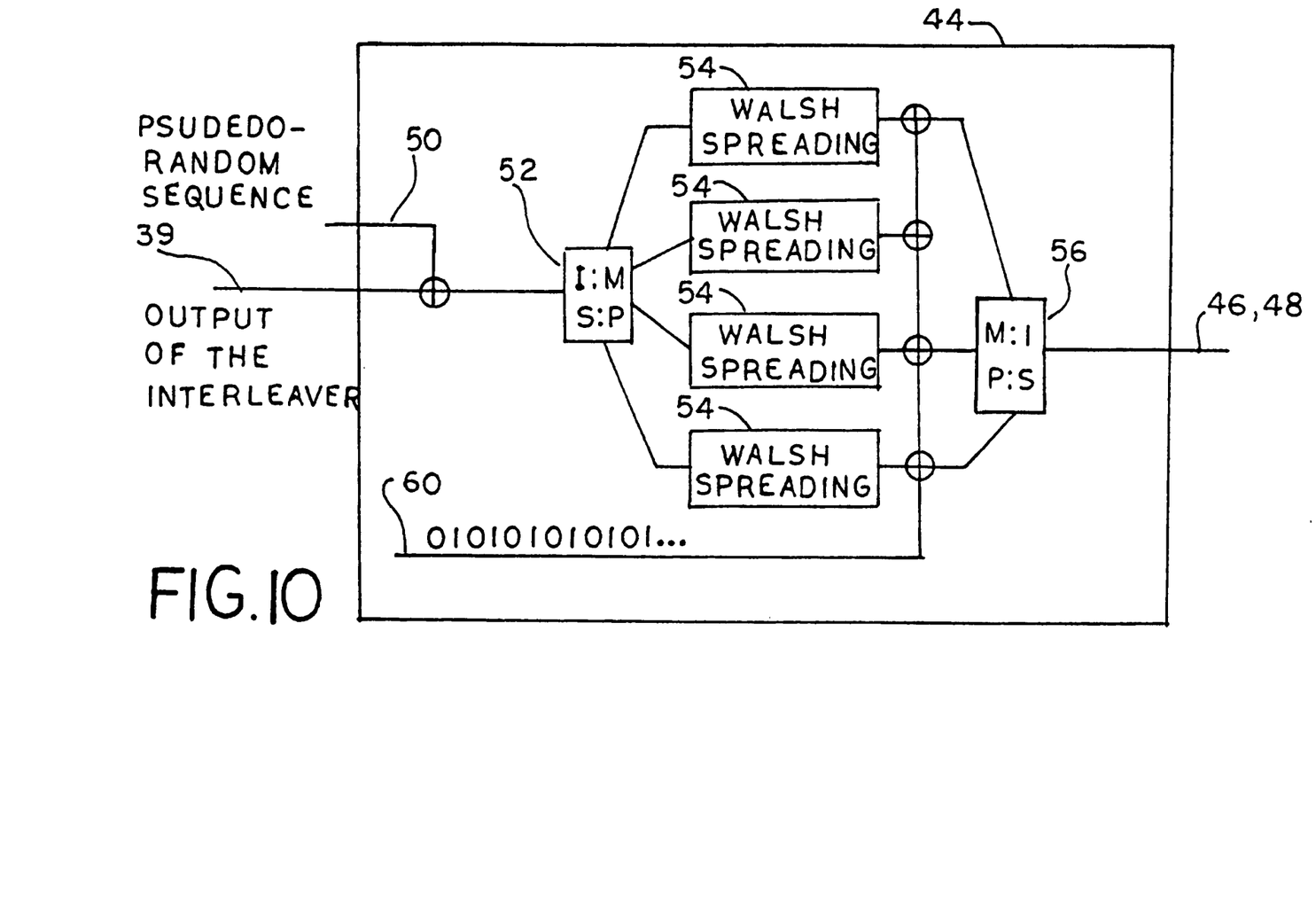
FIG. 10 is a more detailed diagram of another possible orthogonal spreader of FIG. 6 for wideband signals.

As shown by example in FIG. 10, for an even M ratio substantially equal to four, the interleaved data signal 39 is multiplied (scrambled) by a pseudo-random sequence 50 and is then divided into four data streams by a serial-to-parallel convertor 52. Each of the data streams is processed by a Walsh spreading block 54 that encodes the data stream with a Walsh code selected in accordance with the present invention so that no orthogonal code is a prefix of any other orthogonal code assigned within a cell site. Additionally, the Walsh codes used within the spreading blocks 54 may all be the same for a given user, or a user may have multiple codes assigned so that some or all of the spreading blocks 54 use different codes. If the carrier frequencies for wideband overlay signals and narrow-band underlay signals cannot be precisely aligned or spaced in accordance with spectral overlay aspect of the present invention, then Walsh codes are preferably also selected so that the first common nodes are as close as possible to the root of the Walsh tree. The individually spreaded data streams are multiplied by an alternating bit sequence 60 (i.e. 1010101010 . . . ) and then recombined in a parallel-to-serial converter 56 that produces the I channel output 46 or Q channel output 48.

Figure 11:
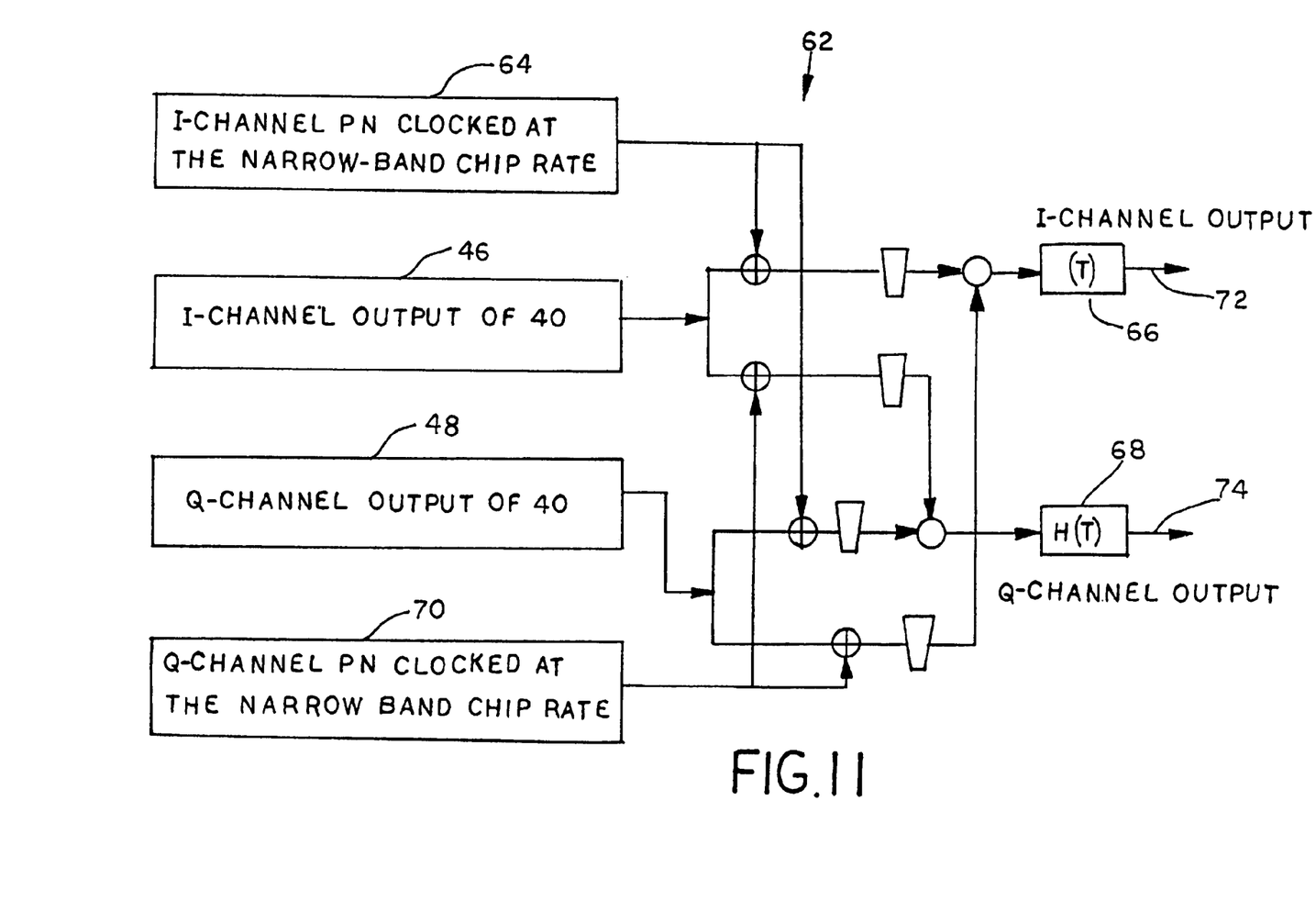
FIG. 11 is a more detailed diagram of the complex spreader of FIG. 6.

A more detailed diagram of the complex spreading block 62 is illustrated in FIG. 11. For both wideband overlay signals and narrow-band underlay signals, the I channel 46 and Q channel 48 signals are multiplied by an I channel pseudo-random sequence 64 and a Q channel pseudo-random sequence 70 that are both clocked at the narrow-band chip rate. First and second pulse shaping filters 66, 68 provide spreaded I and Q outputs 72, 74 to the transmitter 76. Subsequently, the spreaded I and Q outputs are sent as a transmitted signal 78 to wideband users.

Thus, the above description embodies aspects of the present invention. Namely, a wireless communication system simultaneously transmits one or more wideband overlay signals and one or more narrow-band underlay signals by maintaining substantial orthogonality between wideband and narrow-band signals. Orthogonality is maximized, and thus interference between the wideband and narrow-band users is minimized by selectively aligning or spacing the narrow-band carrier frequency/frequencies in accordance with the spectral overlay aspect of the present invention, spreading signals with orthogonal codes particularly selected to minimize correlation between wideband and narrow-band users, and spreading the wideband signals by dividing them into a plurality of data streams, spreading the individual streams, and then recombining the data streams before transmission.

The above method and system of simultaneously transmitting variable chip rate signals are best applied to the synchronized forward link (from the base station to the mobile unit) within a wireless communication system such as the voice/cellular systems described above. However, it is inherently feasible to apply the teachings of the above system and method to the reverse link (i.e. from the mobile unit to the central unit), or more broadly to any communication system employing variable chip rate spread spectrum signals wherein it is desirable to reduce interference between users sharing a common frequency spectrum.

In summary, persons of ordinary skill in the art will readily appreciate that a system and method for transmitting wideband signals via a communications system adapted for transmitting narrow-band signals has been provided. In the accordance with the present invention, by systematically selecting/separating the orthogonal codes and the carrier frequencies 15 (as described above) used by base stations 10 and transceivers 14, 18 in a CDMA system, wideband signals 16 can be transmitted substantially simultaneously with narrow-band signals 12. Systems and apparatus implementing the teachings of the invention can enjoy increased efficiency in bandwidth utilization. In addition, existing communication systems can be inexpensively modified to employ the teachings of the invention without requiring modification to, or replacement of, consumer transmitters 14 such as cellular telephones. In other words, the system is backwards compatible. Further, a wideband system and a narrow-band system (i.e., one spread spectrum system supporting multiple chip rates) may share some common signaling (e.g., control signaling), thereby allowing for seamless hand-offs between the two systems. Still further, having variable chip rates in one system may be desirable for enhancing the system performance of a multimedia network. For instance, by excessively spreading the bandwidth of a low rate service, such as voice service, the capability of multipath tracking and channel estimation is reduced. This incurs implementation loss for the low rate services.

Another benefit of the proposed spreading method can reduce the interference (both self interference and other users interference) in a multipath communication environment. In a typical radio communication environment, radio signals are reflected from many different features of the physical environment. As a result, a signal arrives at a mobile station receiver from many directions with different transmission delays. When the mobile receiver tunes to one of the multipaths, the other paths represent interference. This interference includes the replica of other users and the designated user's signal. An inherent advantage of the spreading scheme presented can mitigate the multipath interference. Besides CDMA systems, this spreading scheme thus may benefit other spread spectrum communication systems.

The foregoing description has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

The invention claimed is:

1. A method comprising:
   encoding a plurality of data streams partitioned from a first data stream using a first code to produce a first plurality of orthogonally encoded data streams, wherein every other bit of the first plurality of orthogonally encoded data streams is inverted; and
   encoding a second data stream using the at least one second code to produce a second encoded data stream,
   wherein the at least one first code and at least one second code are selected according to a criterion relating to prefixes of the at least one first code and the at least one second code, the first plurality of orthogonally encoded data streams being represented by a first data signal having a first bandwidth, and the second encoded data stream being represented by a second data signal having a second bandwidth.

2. A method according to claim 1, further comprising:
   modulating the combined data stream over a first carrier frequency to generate the first data signal; and
   modulating the second encoded data stream over a second carrier frequency to generate the second data signal,
   wherein a ratio of the first bandwidth to the second bandwidth is an even number.

3. A method according to claim 1, further comprising:
   transmitting the first data signal as an overlay onto the second data signal.

4. A method according to claim 1, wherein the criterion specifies that no first or second code or its complement is a prefix for another first or second code or its complement.

5. A method according to claim 1, wherein the at least one second data signal comprises a plurality of narrow-band signals.

6. A method according to claim 5, wherein the plurality of narrow-band signals are separated in frequency from the first carrier frequency by a value that is based on a chip rate of the narrow-band signals.

7. A method according to claim 1, wherein the first and second codes are selected from a set of Walsh codes, the set of Walsh codes corresponding to a Walsh tree.

8. A method according to claim 7, wherein a first node in the Walsh tree that is common to both the first and second codes is closest to a root of the Walsh tree.

9. An apparatus comprising:
   an encoder configured to encode a plurality of data streams partitioned from a first data stream using a first code to produce a first plurality of orthogonally encoded data streams; and
   an inverter configured to invert every other bit of the first plurality of orthogonally encoded data streams,
   wherein the encoder is further configured to encode a second data stream using the at least one second code to produce a second encoded data stream, wherein the at least one first code and at least one second code are selected according to a criterion relating to prefixes of the at least one first code and the at least one second code, the first plurality of orthogonally encoded data streams being represented by a first data signal having a first bandwidth, and the second encoded data stream being represented by a second data signal having a second bandwidth.

10. An apparatus according to claim 9, further comprising: a modulator configured to modulate the combined data stream over a first carrier frequency to generate the first data signal, and to modulate the second encoded data stream over a second carrier frequency to generate the second data signal, wherein a ratio of the first bandwidth to the second bandwidth is an even number.

11. An apparatus according to claim 9, further comprising: a transmitter configured to transmit the first data signal as an overlay onto the second data signal.

12. An apparatus according to claim 9, wherein the criterion specifies that no first or second code or its complement is a prefix for another first or second code or its complement.

13. An apparatus according to claim 9, wherein the at least one second data signal comprises a plurality of narrow-band signals.

14. An apparatus according to claim 13, wherein the plurality of narrow-band signals are separated in frequency from the first carrier frequency by a value that is based on a chip rate of the narrow-band signals.

15. An apparatus according to claim 9, wherein the first and second codes are selected from a set of Walsh codes, the set of Walsh codes corresponding to a Walsh tree.

16. An apparatus according to claim 15, wherein a first node in the Walsh tree that is common to both the first and second codes is closest to a root of the Walsh tree.

17. A method comprising:
receiving an overlay signal including a first data signal of a first bandwidth and a second data signal of a second bandwidth, wherein the first data signal represents a first plurality of orthogonally encoded data streams, and the second data signal represents a second encoded data stream, every other bit of the first plurality of orthogonally encoded data streams being inverted;
decoding the first plurality of orthogonally encoded data streams to output a first data stream based on at least one first code; and
decoding the second encoded data stream to output a second data stream based on at least one second code,
wherein the at least one first code and at least one second code are selected according to a criterion relating to prefixes of the at least one first code and the at least one second code.

18. A method according to claim 17, further comprising: demodulating the first data signal and the second data signal, wherein a ratio of the first bandwidth to the second bandwidth is an even number.

19. A method according to claim 17, wherein the criterion specifies that no first or second code or its complement is a prefix for another first or second code or its complement.

20. A method according to claim 17, wherein the second data signal comprises a plurality of narrow-band signals.

21. A method according to claim 20, wherein the plurality of narrow-band signals are separated in frequency from a first carrier frequency of the first data signal by a value that is based on a chip rate of the narrow-band signals.

22. A method according to claim 17, wherein the first and second codes are selected from a set of Walsh codes, the set of Walsh codes corresponding to a Walsh tree.

23. A method according to claim 22, wherein a first node in the Walsh tree that is common to both the first and second codes is closest to a root of the Walsh tree.

24. An apparatus comprising:
a receiver configured to receive an overlay signal including a first data signal of a first bandwidth and a second data signal of a second bandwidth, wherein the first data signal represents a first plurality of orthogonally encoded data streams, and the second data signal represents a second encoded data stream, every other bit of the first plurality of orthogonally encoded data streams being inverted; and
a decoder configured to decode the first plurality of orthogonally encoded data streams to output a first data stream based on at least one first code, and to decode the second encoded data stream to output a second data stream based on at least one second code,
wherein the at least one first code and at least one second code are selected according to a criterion relating to prefixes of the at least one first code and the at least one second code.

25. An apparatus according to claim 24, further comprising:
a demodulator configured to demodulate the first-data signal and the second data signal, wherein a ratio of the first bandwidth to the second bandwidth is an even number.

26. An apparatus according to claim 24, wherein the criterion specifies that no first or second code or its complement is a prefix for another first or second code or its complement.

27. An apparatus according to claim 24, wherein the second data signal comprises a plurality of narrow-band signals.

28. An apparatus according to claim 27, wherein the plurality of narrow-band signals are separated in frequency from a first carrier frequency of the first data signal by a value that is based on a chip rate of the narrow-band signals.

29. An apparatus according to claim 24, wherein the first and second codes are selected from a set of Walsh codes, the set of Walsh codes corresponding to a Walsh tree.

30. An apparatus according to claim 29, wherein a first node in the Walsh tree that is common to both the first and second codes is closest to a root of the Walsh tree.

* * * * *